United States Patent
Carlyle et al.

(10) Patent No.: US 11,613,097 B2
(45) Date of Patent: Mar. 28, 2023

(54) CONTINUOUS FILAMENT CELLULOSE NONWOVEN MADE WITH MULTIPLE BONDING TECHNIQUES

(71) Applicant: LENZING AG, Lenzing (AT)

(72) Inventors: Tom Carlyle, Holly Springs, NC (US); Mirko Einzmann, Wels (AT); Gisela Goldhalm, Neufurth (AT); Malcolm John Hayhurst, Bulkington (GB); Katharina Mayer, Altmünster (AT); Ibrahim Sagerer-Foric, Vöcklabruck (AT)

(73) Assignee: LENZING AG, Lenzing (AT)

( * ) Notice: Subject to any disclaimer, the term of this patent is extended or adjusted under 35 U.S.C. 154(b) by 47 days.

(21) Appl. No.: 16/500,336

(22) PCT Filed: Apr. 3, 2017

(86) PCT No.: PCT/AT2017/000019
§ 371 (c)(1),
(2) Date: Oct. 2, 2019

(87) PCT Pub. No.: WO2018/184038
PCT Pub. Date: Oct. 11, 2018

(65) Prior Publication Data
US 2021/0101362 A1    Apr. 8, 2021

(51) Int. Cl.
*B32B 5/26*        (2006.01)
*D04H 1/4258*      (2012.01)
(Continued)

(52) U.S. Cl.
CPC .............. *B32B 5/26* (2013.01); *A45D 44/002* (2013.01); *B32B 5/022* (2013.01); *B32B 5/06* (2013.01);
(Continued)

(58) Field of Classification Search
CPC .. B32B 5/022; B32B 5/26; B32B 5/06; B32B 7/09; B32B 7/12; B32B 7/02; B32B 7/06;
(Continued)

(56) References Cited

U.S. PATENT DOCUMENTS

| | | |
|---|---|---|
| 4,741,941 A | 5/1988 | Englebert et al. |
| 5,173,356 A | 12/1992 | Eaton et al. |

(Continued)

FOREIGN PATENT DOCUMENTS

| | | |
|---|---|---|
| EP | 1093536 B1 | 4/2001 |
| EP | 2013390 B1 | 1/2009 |

(Continued)

OTHER PUBLICATIONS

M.J. Hayhurst, "Spunbond Cellulose", Chemical Fibers International, 6, pp. 386, 388-390, 392 (2006).
(Continued)

*Primary Examiner* — Jeremy R Pierce
(74) *Attorney, Agent, or Firm* — Venable LLP

(57) ABSTRACT

This invention relates to a nonwoven material consisting of one or more layers of nonwoven webs of essentially continuous cellulosic filaments, characterized in that within each layer each of the three bonding mechanisms: a) hydrogen bonding, b) filament intermingling and c) merged filament bonding occur for bonding the essentially continuous cellulosic filaments. Further it relates to a process for the manufacture and to various uses of this material.

24 Claims, 1 Drawing Sheet

Figure 1:
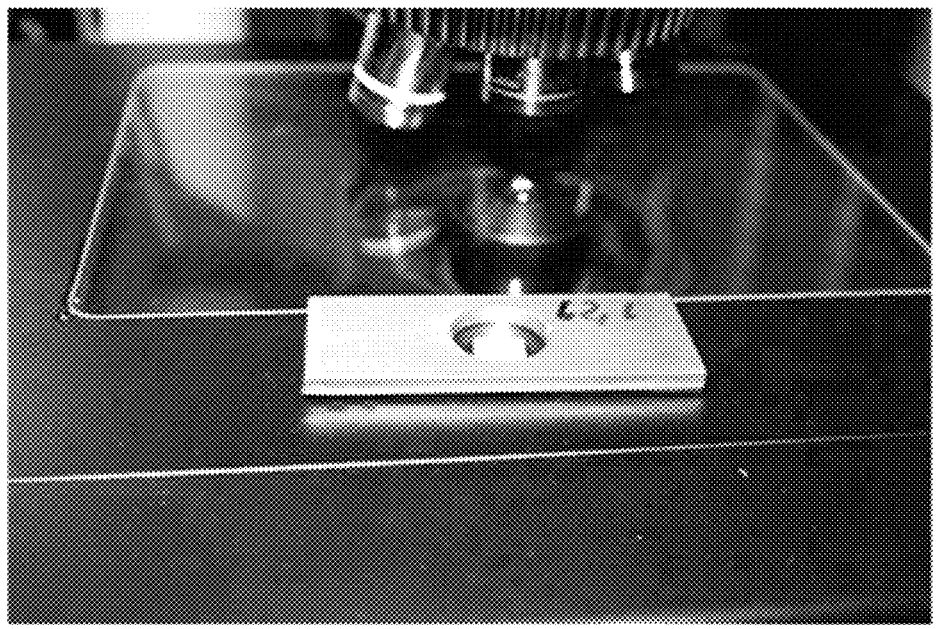

(51) Int. Cl.
- *B32B 7/09* (2019.01)
- *A45D 44/00* (2006.01)
- *B32B 5/02* (2006.01)
- *B32B 5/06* (2006.01)
- *B32B 7/02* (2019.01)
- *B32B 7/06* (2019.01)
- *B32B 7/12* (2006.01)
- *D04H 1/485* (2012.01)
- *D04H 1/492* (2012.01)
- *D04H 1/498* (2012.01)
- *D04H 1/56* (2006.01)
- *D04H 3/11* (2012.01)
- *D04H 3/16* (2006.01)

(52) U.S. Cl.
CPC ............... *B32B 7/02* (2013.01); *B32B 7/06* (2013.01); *B32B 7/09* (2019.01); *B32B 7/12* (2013.01); *D04H 1/4258* (2013.01); *D04H 1/485* (2013.01); *D04H 1/492* (2013.01); *D04H 1/498* (2013.01); *D04H 1/56* (2013.01); *D04H 3/11* (2013.01); *D04H 3/16* (2013.01); *B32B 2250/02* (2013.01); *B32B 2250/03* (2013.01); *B32B 2250/04* (2013.01); *B32B 2250/05* (2013.01); *B32B 2250/20* (2013.01); *B32B 2260/04* (2013.01); *B32B 2262/062* (2013.01); *B32B 2307/54* (2013.01); *B32B 2307/7145* (2013.01); *B32B 2307/7163* (2013.01); *B32B 2307/726* (2013.01); *B32B 2307/73* (2013.01); *B32B 2307/734* (2013.01); *B32B 2432/00* (2013.01); *B32B 2535/00* (2013.01); *B32B 2555/00* (2013.01); *B32B 2555/02* (2013.01)

(58) Field of Classification Search
CPC ............ B32B 2250/20; B32B 2432/00; B32B 2262/062; B32B 2307/54; B32B 2307/726; B32B 2307/73; B32B 2307/734; B32B 2307/7145; B32B 2307/7163; B32B 2535/00; B32B 2555/00; B32B 2555/02; B32B 2250/02; B32B 2250/03; B32B 2250/04; B32B 2250/05; D04H 1/4258; D04H 1/485; D04H 1/492; D04H 1/498; D04H 1/56; D04H 3/11; D04H 3/16; A45D 44/002

See application file for complete search history.

(56) References Cited

U.S. PATENT DOCUMENTS

| | | | |
|---|---|---|---|
| 6,358,461 | B1 | 3/2002 | Law et al. |
| 6,485,667 | B1 | 11/2002 | Tan |
| 6,675,702 | B1 | 1/2004 | Maksimow |
| 6,790,527 | B1 | 9/2004 | Luo et al. |
| 7,067,444 | B2 | 6/2006 | Luo et al. |
| 8,012,565 | B2 | 9/2011 | Luo |
| 8,191,214 | B2 | 6/2012 | Luo et al. |
| 8,263,506 | B2 | 9/2012 | Luo |
| 8,318,318 | B2 | 11/2012 | Luo et al. |
| 9,309,627 | B2 | 4/2016 | Miller et al. |
| 9,339,581 | B2 | 5/2016 | Uda et al. |
| 2005/0008839 | A1 | 1/2005 | Cramer et al. |
| 2005/0056956 | A1* | 3/2005 | Zhao ............... D04H 18/04 264/37.24 |
| 2009/0324926 | A1 | 12/2009 | Luo |
| 2011/0124258 | A1* | 5/2011 | White ............... D04H 3/11 442/408 |
| 2014/0315461 | A1 | 10/2014 | Schachtner et al. |

FOREIGN PATENT DOCUMENTS

| | | |
|---|---|---|
| EP | 2212456 B1 | 8/2010 |
| GB | 2337957 A | 12/1999 |
| JP | 2003-508647 A | 3/2003 |
| JP | 2005-516130 A | 6/2005 |
| JP | 2015-502460 A | 1/2015 |
| WO | 2007/124521 A1 | 11/2007 |

OTHER PUBLICATIONS

International Search Report and Written Opinion in corresponding International Application No. PCT/AT2017/000019 (12 pages).

\* cited by examiner

CONTINUOUS FILAMENT CELLULOSE NONWOVEN MADE WITH MULTIPLE BONDING TECHNIQUES

The present application is a national-stage entry under 35 U.S.C. § 371 of International Patent Application No. PCT/AT2017/000019, published as WO 2018/184038 A1, filed Apr. 3, 2017, the entire disclosure of which is hereby incorporated by reference.

This invention relates to a nonwoven web formed from the bonding of essentially continuous filament cellulose, whose properties can be enhanced by modification of web bonding. This web is bonded by a combination of processes: physical intermingling of filaments prior to and during initial web formation, hydrogen bonding between filaments (developed during web drying) and bonding via merged filaments (developed during the fiber formation and web formation processes). Optionally, post-web formation steps such as hydroentanglement, needle-punching, adhesive bonding and/or chemical bonding may also be employed. Hydrogen bonding occurs naturally when dealing with cellulose fibers and water. The contribution of hydrogen bonding to the overall tensile strength performance of the nonwoven web is small compared to the contribution of the other bonding processes. The degree of merged filaments can be controlled by adjustment of process conditions prior to and during initial laydown of filaments to form the web. For lyocell-based technology, applying coagulation liquor to filaments after initial extrusion but before laydown, for example via a spray system, can be used to exercise a high level of control over the degree of merged filaments. Control of merged filament bonding, in combination with the other bonding processes, will yield nonwoven webs with property enhancements. These enhancements are not producible with any singular bonding technology.

PRIOR ART

There is very little teaching relating to bonding mechanisms and property relationships for nonwoven webs comprising essentially continuous filament cellulose.

There is some teaching regarding nonwoven webs comprising thermoplastic fibers. For example, U.S. at. No. 4,741,941 suggests both physical entanglement and merged filaments are present in meltblown and spunbond polyolefins. U.S. Pat. No. 5,173,356 mentions both physical entanglement and merged or fused filaments as providing some strength or integrity.

However, merging would not be expected as a feature of cellulose filaments, which are not thermoplastic.

Hydrogen bonding is a well-known bonding technique for cellulose fibers, used in both paper and nonwovens processes and products. For example, U.S. Pat. No. 6,485,667 teaches the use of compacting airlaid pulp at an elevated temperature to produce a nonwoven web bonded solely by hydrogen bonds. U.S. Pat. No. 9,309,627 shows the use of both wood pulp and lyocell fibers in a hydrogen bonded structure. Merged filament bonding for short cellulose fibers (i.e. not the essentially continuous material of this invention) is claimed by U.S. Pat. No. 6,675,702, using extremely high pressure compaction, but resulting in very low wet strength. U.S. Pat. No. 9,339,581 teaches that blending cellulosic fibers with thermoplastic fibers permits both hydrogen bonding and merged filament bonding.

Problem

Nonwoven webs are used for many applications. These applications have varying requirements with regards to softness, stiffness, dimensional stability, moisture management and various other properties. In some cases, the optimum properties are not achievable with current nonwoven technologies. In particular, it is desirable to achieve the following combination of features, not possible with current products:

Lightweight and absorbent
Lightweight, absorbent and sufficient tensile strength
Lightweight, absorbent, sufficient strength and purity (no use of chemical treatments)
Good stiffness and absorbency
Good stiffness, absorbency and fast wicking rates.
Acceptable softness, drape and dimensional stability
No undesirable additional chemical treatment to achieve required properties
Biodegradable and/or compostable, absorbent and lightweight.
Sustainably sourced, absorbent and light weight

DESCRIPTION

It is an object of the present invention to provide a nonwoven web comprising essentially continuous cellulose fibers which offers a broader range of properties than currently available. This is achieved by a nonwoven material consisting of one or more layers of nonwoven webs of essentially continuous cellulosic filaments, characterized in that within each layer each of the three bonding mechanisms: a) hydrogen bonding given naturally due to the existence of hydroxyl groups in the cellulose in the presence of water, b) filament intermingling and c) merged filament bonding occur for bonding the essentially continuous cellulosic filaments.

In a preferred embodiment of the invention the number of layers is one. In another preferred embodiment of the invention the number of layers is at least two, preferably between two and ten, further preferred between 2 and 6. In a possible embodiment of the invention two or more of these layers are bonded together using merged filament bonding, hydrogen bonding and filament intermingling. In a preferred embodiment all layers within the material are bonded together by the same bonding techniques; in another preferred embodiment only 2 or 3 layers are bonded together by the same technique; in another preferred embodiment different techniques are used to bond layers. The combination of web layers and bonding provide a wider range of control over material formation (appearance), material thickness/material density (at a given basis weight, the higher the number of layers the higher the achievable thickness, and the lower the achievable density), material air porosity (same reasoning as thickness) and material tensile performance (the higher the number of layers the higher the achievable material tensile strengths).

In a preferred embodiment of the invention the nonwoven material is further hydroentangled and/or spunlaced and/or needled and/or needlepunched, and/or bonded by adhesive and/or other chemical bonding techniques. These additional processes provide an even greater range of possible physical property variation. In one embodiment, the material can be additional processed by hydroentangling which can provide additional strength and remove any loose particles. This will provide a strong material with low particle counts that is suitable for medical wound care absorbent pads. In another embodiment, the material can undergo the additional process of needlepunching which can provide a very dense structure, that when combined with its fluid wicking properties, could be used as a biodegradable felt tip for marking pens. In another embodiment, the material can undergo the additional process of adhesive bonding which can provide a very stiff structure that could be used as a scrim in construction materials allowing for stucco materials to be spread more evenly and providing a matrix for the stucco material to adhere more securely to a wall. The above embodiment descriptions are not meant to be limiting, they are intended to describe how additional processing by hydroentangling and/or spunlacing and/or needling and/or needlepunching, and/or by adhesive and/or other chemical bonding techniques, can enable a wider array of physical property modification of the invention.

Preferably the nonwoven material further has been subjected to after-treatments such as chemical treatment or plasma process (also known as corona process) in order to impart or enhance certain physical and chemical properties of the invention. In one embodiment, the material can be chemically treated with a wax that will decrease the water absorbent capacity of the material, even resulting in a hydrophobic material. In another embodiment, the material can undergo a surface plasma treatment that will impact a different chemical and physical character to the surface allowing for better adhesion to synthetic films, resulting in a material that has very fast fluid wicking properties on one side, and also has a barrier on the other preventing fluid transfer through the material. The above embodiment descriptions are not meant to be limiting, they are intended to describe how additional processing by chemical treatment and/or plasma treatment can enable a wider array of physical and chemical property modification to the invention.

In a particular embodiment of the present invention at least one, and preferably all of the webs of essentially continuous cellulosic filaments are consisting of lyocell filaments.

The cellulosic filament web according to the invention can contain additives that have been incorporated into the filament. Such additives as well as methods to incorporate them into a lyocell material are in principle known to the expert. These additives would be used to modify the existing chemical and/or physical properties of the material, or to impart new chemical and/or physical properties to the material.

Cellulosic fibers can be produced by various processes. In one embodiment a lyocell fiber is spun from cellulose dissolved in N-methyl morpholine N-oxide (NMMO) by a meltblown process, in principle known from e.g. EP 1093536 B1, EP 2013390 B1 and EP 2212456 B1. Where the term meltblown is used it will be understood that it refers to a process that is similar or analogous to the process used for the production of synthetic thermoplastic fibers (filaments are extruded under pressure through nozzles and stretched to required degree by high velocity/high temperature extension air flowing substantially parallel to the filament direction), even though the cellulose is dissolved in solution (i.e. not a molten thermoplastic) and the spinning & air temperatures are only moderately elevated. Therefore the term "solution blown" may be even more appropriate here instead of the term "meltblown" which has already become somewhat common for these kinds of technologies. For the purposes of the present invention both terms can be used synonymously. In another embodiment the web is formed by a spun bonding process, where filaments are stretched via lower temperature air. In general, spunbonded synthetic fibers are longer than meltblown synthetic fibers which usually come in discrete shorter lengths. Fibers formed by the solution blown lyocell process can be continuous or discontinuous depending on process conditions such as extension air velocity, air pressure, air temperature, viscosity of the solution, cellulose molecular weight and distribution and combinations thereof.

In one embodiment for making a nonwoven web the fibers are contacted with a non-solvent such as water (or water/NMMO mixture) by spraying, after extrusion but before web formation. The fibers are subsequently taken up on a moving foraminous support to form a nonwoven web, washed and dried.

Freshly-extruded lyocell solution ('solvent spun', which will contain only, for example, 5-15% cellulose) behaves in a similar way to 'sticky' and deformable thermoplastic filaments. Causing the freshly-spun filaments to contact each other while still swollen with solvent and with a 'sticky' surface under even low pressure will cause merged filament bonding, where molecules from one filament mix irreversibly with molecules from a different filament. Once the solvent is removed and coagulation of filaments completed, this type of bonding is impossible.

It is another object of the present invention to provide a process for the manufacture of a nonwoven material consisting of essentially continuous cellulosic filaments by:
  a. Preparation of a cellulose-containing spinning solution
  b. Extrusion of the spinning solution through at least one spinneret containing closely-spaced meltblown jet nozzles
  c. Attenuation of the extruded spinning solution using high velocity air streams,
  d. Forming of the web onto a moving surface [e.g. a perforated belt or drum],
  e. Washing of the formed web
  f. Drying of the washed web wherein in step c. and/or d. coagulation liquor, i.e. a liquid which is able to cause coagulation of the dissolved cellulose; in a lyocell process this preferably is water or a diluted solution of NMMO in water, is applied to control the merged filament bonding. The amount of merged filament bonding is directly dependent on the stage of coagulation of the filaments when the filaments come into contact. The earlier in the coagulation process that the filaments come into contact, the greater the degree of filament merging that is possible. Both placement of the coagulation liquor application and the speed at which the application liquor is applied can either increase, or decrease, the rate of coagulation. Which results in control of the degree (or amount) of merged filament bonding that occurs in the material.

Preferably the merged filament bonding is further controlled by filament spinning nozzle design and arrangement and the configuration and temperature of filament extension air. The degree of molecular alignment that is present as the solution exits the spinning nozzle has an impact on the coagulation rate. The more aligned the molecules are, the faster the coagulation rate, and conversely, the less aligned the molecules are, the slower the coagulation rate. The spinning nozzle design and arrangement, along with the molecular weight of the cellulosic raw material used will determine the starting coagulation rate at the exit of the spinning nozzle. Additionally, the rate of cooling (temperature decrease) of the solution upon spinning nozzle exit will impact the coagulation rate as well. The slower the cooling rate, the slower the coagulation rate, and conversely, the faster the cooling rate, the faster the coagulation rate. Therefore, configuration of the filament extension air can directing impact the cooling rate and therefore, impact the coagulation rate, which impacts the achievable amount of merged filament bonding that is possible.

In a preferred embodiment of the process according to the invention at least two spinnerets (also known as jets), preferably between two and ten, and further preferred between 2 and 6, each one arranged to form a layer of nonwoven web, are used to obtain a multilayer nonwoven material. By applying different process conditions at the individual spinnerets it is even possible to obtain a multi-layer nonwoven material wherein the individual layers have different properties. This may be useful to optimize the nonwoven material according to the invention for different applications. In one embodiment this could provide a gradient of filament diameters from one side of the material to the other side by having each individual web having a standard filament diameter that is less than the web on top, it is possible to create a material suitable for use as an air filter media that will provide a gradient of pore size (particle size capture). This will provide an efficient filtration process and result in a lower pressure drop across the filter media compared to a single web with similar characteristics at the same basis weight and pore size distribution.

Preferably the filaments are spun using a solution of cellulose in an aqueous amine oxide and the coagulation liquor is water, preferably with a content of amine oxide not being able to dissolve cellulose, also referred to as a lyocell process; the manufacture of such a solution is in principle known, e.g. from U.S. Pat. Nos. 6,358,461, 7,067,444, 8,012,565, 8,191,214, 8,263,506, 8,318,318; preferably the amine oxide is NMMO.

The present invention describes a cellulosic nonwoven web produced via a meltblown or spunbond-type process. The filaments produced are subjected to touching and/or compaction and/or intermingling at various points in the process, particularly before and during initial web formation. Contact between filaments where a high proportion of solvent is still present and the filaments are still swollen with said solvent causes merged filament bonding to occur. The amount of solvent present as well as temperature and contact pressure (for example resulting from extension air) controls the amount of this bonding.

In particular the amount of filament intermingling and hydrogen bonding can be limited by the degree of merged filament bonding. This is the result of a decrease in filament surface area and a decrease in the degree of flexibility of the filaments. For instance, as the degree of merged filament bonding increase, the amount of overall surface area is decreased, and the ability of cellulose to form hydrogen bonds is directly dependent on the amount of hydroxyl groups present on the cellulosic surface. Additionally, filament intermingling happens as the filaments contact the forming belt. The filaments are traveling at a faster rate of speed than the forming belt. Therefore, as the filament contacts the belt, it will buckle and sway side to side, and back and forth, just above the forming belt. During this buckling and swaying, the filaments will intermingle with neighboring filaments. If the filaments touch and merge prior to the forming belt, this limits the number of neighboring filaments by which it can intermingle with. Additionally, filaments that merge prior to contacting the forming belt with not have the same degree of flexibility as a single filament and this will limit the total area over which the filament will buckle and sway.

Surprisingly, it has been found that high levels of control of filament merging can be achieved by modifying key process variables. In addition, physical intermingling of at least partially coagulated cellulose filaments can occur after initial contact with non-solvent, particularly at initial filament laydown to form the web. It arises from the potential of the essentially continuous filaments to move laterally during initial filament formation and initial laydown. Degree of physical intermingling is influenced by process conditions such as residual extension air velocity at the foraminous support (forming belt). It is completely different from the intermingling used in production of webs derived from cellulose staple fibers. For staple fibers, an additional process step such as calendaring is applied after the web has been formed. Filaments which still contain some residual solvent are weak, tender and prone to damage. Therefore, in combination with controlling degree and type of bonding at this stage, it is essential that process conditions are not of a type which could cause filament and web damage. Initial drying of the washed but never-dried nonwoven, together with optionally compacting, will cause additional hydrogen bonding between filaments to develop. Modifying temperature, compacting pressure or moisture levels can control the degree of this hydrogen bonding. Such treatment has no effect on intermingling or the merged filament bonding.

In a preferred embodiment of the invention the nonwoven material is dried prior to subsequent bonding/treatment.

In a preferred embodiment of the invention the percentage of each type of bonding is controlled using a process with up to two compaction steps, where one of these compaction steps is done after step d. of the inventive process where the spun filaments are still swollen with a solvent, and one of these compaction steps is done before or in step e. of the inventive process where all or most of the solvent has been removed and the web has been wet with water. As previously discussed, control of the coagulation of the spun solution is a factor in controlling the degree of merged filament bonding. This preferred embodiment concerns decreasing the coagulation rate to a state where additional compaction steps can be used after filament laydown to further increase the actual amount of merged filament boding that is achievable. It might be helpful to view the maximum achievable filament bonding as the state where we have merged all filaments into an essentially film-like structure.

The present invention describes a process and product where merged filament bonding, physical intermingling and hydrogen bonding can be controlled independently. However, the degree of merged filament bonding can limit the degree of physical intermingling and hydrogen bonding that can occur. In addition, for the production of multi-layer web products, process conditions can be adjusted to optimise these bonding mechanisms between layers. This can include modifying ease of delamination of layers, if required.

In addition to merged filament, intermingling and hydrogen bonding being independently set as described above, additional bonding/treatment steps may optionally be added. These bonding/treatment steps may occur while the web is still wet with water, or dried (either fully or partially). These bonding/treatment steps may add additional bonding and/or other web property modification. These other bonding/treatment steps include hydroentangling or spunlacing, needling or needlepunching, adhesive or chemically bonding. As will be familiar to those skilled in the art, various post-treatments to the web may also be applied to achieve specific product performance. By contrast, when post-treatments are not required, it is possible to apply finishes and other chemical treatments directly to the web of this invention during production which will not then be removed, as occurs with, for example, a post-treatment hydroentanglement step.

Varying the degree of merged filament bonding provides unique property characteristics for nonwoven cellulose webs with regards to softness, stiffness, dimensional stability and various other properties. Properties may also be modified by altering the degree of physical intermingling before and during initial web formation. It is also possible to influence hydrogen bonding, but the desired effect of this on web properties is minor. Additionally, properties can be adjusted further by including an additional bonding/treatment step such as hydroentangling, needlepunching, adhesive bonding and/or chemical bonding. Each type of bonding/treatment provides benefits to the nonwoven web. For example, hydroentangling can add some strength and soften the web as well as potentially modifying bulk density; needling is typically employed for higher basis weights and used to provide additional strength; adhesive and chemical bonding can add both strength and surface treatments, like abrasive material, tackifiers, or even surface lubricants.

Prior art, for example U.S. Pat. No. 6,675,702, teaches that for 100% cellulosic fibers or filaments, hydrogen bonding and merged filament bonding are not independent, but are related. I.e. it is impossible to manipulate merged filament bonding without affecting hydrogen bonding significantly. The present invention allows independent control of the key web bonding features: merged filaments, intermingling at web formation, hydrogen bonding and optional additional downstream processing. Manipulation of merged filament bonding can be varied to predominantly dictate the properties of the nonwoven web.

Products resulting from various implementations of the current invention are optimal for, but not limited to, the following end uses:
Wipes; dry, wet, cleaning, disinfectant, personal care
Filters; air and liquid
Dryer sheets
Dye catcher sheets
Beauty face masks
Wound care absorbent layer
Moisture management layers; disposable and reusable baby diapers, feminine hygiene pads and/or adult incontinence products.

Therefore another object of the present invention is the use of a nonwoven material according to the invention to manufacture a cleaning wet wipe by adding at least one additive selected from the group consisting of a cleansing agent, a sterilizing agent, a deodorizing agent, a disinfectant, a moisturizing agent and a cosmetic remover.

Further the nonwoven material according to the invention can be used to manufacture a dry cleaning wipe for a variety of household, institutional and industrial cleaning, polishing or surface preparation applications.

Further the nonwoven material according to the invention can be used to manufacture a dry cleaning wipe for a variety of cleaning applications where water and/or oil absorption are needed.

Further the nonwoven material according to the invention can be used to manufacture a cleaning wipe which finally can be packaged dry and water-activated just prior to use.

Further the nonwoven material according to the invention can be used to manufacture an air filtration media or a liquid filtration media.

Further the nonwoven material according to the invention can be used to manufacture a dryer sheet by impregnating the nonwoven material with at least one of the following chemicals: antistat, quaternary softeners and/or waxes.

Further the nonwoven material according to the invention can be used to manufacture a wound care absorbent layer.

Further the nonwoven material according to the invention can be used to manufacture a wound care absorbent layer by post-treating the nonwoven material with a pharmaceutical active ingredient.

Further the nonwoven material according to the invention can be used to manufacture a moisture management layer for disposable or reusable baby diapers, feminine hygiene pads and/or adult incontinence products.

Further the nonwoven material according to the invention can be used for carbonization to manufacture a carbonized web.

Further the nonwoven material according to the invention can be used to manufacture a dye catcher sheet by impregnation with one or more agents out of the group of agents consisting of known chemical and polymeric dye transfer inhibitors, dye absorbers and scavengers, bleaching and oxidative agents or other chemicals.

Further the nonwoven material according to the invention can be used to manufacture a beauty face mask sheet that is impregnated with various skin care and beauty lotions or liquids.

Further the nonwoven material according to the invention can be used to manufacture a beauty care facial mask that further can be packaged dry and water-activated just prior to use.

The invention will now be illustrated by examples. These examples are not limiting the scope of the invention in any way. The invention includes also any other embodiments which are based on the same inventive concept

EXAMPLES

All samples discussed below were conditioned at 23° C. (±2° C.) and 50% (±5%) relative humidity for 24 hours.

Example 1

A cellulose nonwoven web was produced by the following steps:
A lyocell spinning solution containing 10% cellulose was prepared using known methods
The spinning solution was extruded through closely-spaced meltblown jet nozzles and attenuated using high velocity air streams, again using known methods
The web was formed onto a moving belt, washed and dried, giving a web weight of 40 gsm and average diameter of unmerged filaments of around 5 microns
During preparation of the web, five different amounts of initial coagulation spray were applied between filament extrusion and initial web formation. Web samples were collected at each of the five application levels.

The degree of merged filaments in each sample was assessed by the following method:
A 1 cm×1 cm sample (conditioned at 23° C. (±2° C.) and 50% (±5%) relative humidity for 24 hours) of the web is mounted under a cover slip on a microscope slide and additionally retained by a 62.6 g frame (see FIG. 1). FIG. 1 shows the preparation of web sample with retaining frame for microscope examination. It is then examined via an optical microscope at magnification of ×100. From the image of the sample, a 1 mm×1 mm square of web is chosen at random and two diagonals drawn in this square.

Figure 2:
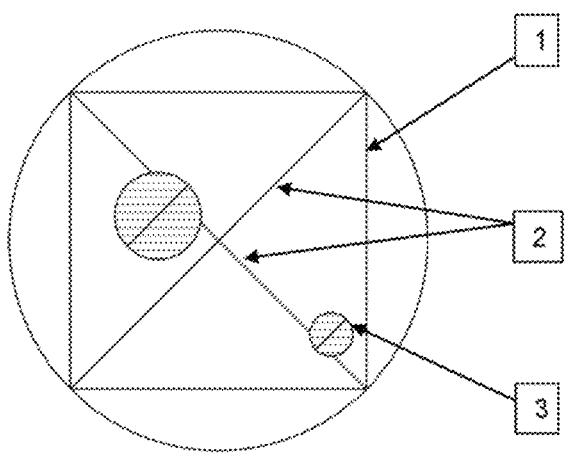

The number of filaments (individual and as merged bundles) visible to a depth of 300 microns which intersect with the diagonal lines is counted and diameter of each of these individual filaments and merged bundles is measured (see FIG. 2). FIG. 2 shows the illustration of a method to assess 'equivalent average filament diameter' factor (sample size 1 mm×1 mm square, magnification ×100) with web sample assessment area (1), size 1 mm×1 mm; evaluation lines (2)-all filaments which intersect these lines are counted and measured; and an example of single filament or merged filament bundle (3) intersecting the evaluation line; the equivalent diameter is measured accordingly. This data is then used to calculate an 'equivalent average filament diameter' factor (sum of diameter measurements divided by number of items measured).

The process is repeated on two further samples of the same web and individual data combined to ensure achievement of a representative result.

The higher that the 'equivalent average filament diameter' factor is compared to the average diameter of individual filaments, the higher the proportion of merged filaments present. An 'equivalent average filament diameter' factor close to the average diameter of individual filaments indicates a very low incidence of merged filaments.

Samples of the webs were conditioned at 23° C. (±2° C.) and 50% (±5%) relative humidity, and then tested for tensile properties and stiffness. Tensile properties are measured according to standard method DIN EN 29 073 part 3/ISO 9073-3, although a clamping length of 8 cm rather than 20 cm is used. Stiffness is measured using a "Handle-o-meter" (available from e.g. Thwing-Albert Instrument Co, 14 West Collings Avenue West Berlin, N.J. 08091, USA), according to standard method WSP 90.3, with ¼ inch slot width, stainless steel surface, 1000 g beam.

The results were as shown in Table 1. Sample reference 1.3 is the 'standard', against which other test results are compared.

TABLE 1

| Sample Reference | Coag spray amount (vs standard) | Equivalent average filament diameter (micron) | Machine Direction | | Cross Direction | | Stiffness (vs standard) |
|---|---|---|---|---|---|---|---|
| | | | Strength (vs standard) | Extension (vs standard) | Strength (vs standard) | Extension (vs standard) | |
| 1.1 | 0.2× | 75 | 1.7× | 0.4× | 1.8× | 0.5× | 2.5× |
| 1.2 | 0.5× | 50 | 1.4× | 0.8× | 1.4× | 0.9× | 1.7× |
| 1.3 | 1.0× | 30 | 1.0× | 1.0× | 1.0× | 1.0× | 1.0× |
| 1.4 | 1.5× | 25 | 0.8× | 1.15× | 0.8× | 1.15× | 0.6× |
| 1.5 | 2.0× | 20 | 0.7× | 1.2× | 0.7× | 1.25× | 0.5× |

The results clearly show that decreasing coagulation spray increases degree of filament merge, as measured by 'equivalent average filament diameter'. This is accompanied by changes in web properties. In these examples, tensile strength and stiffness are increased, while elongation is decreased, with increased filament merge Example 2

Web production was carried out at the conditions given in example 1, with the single difference that the distance between the nozzles were 2× that of the meltblown jet used in example. Web samples were analysed in the same way as those in example 1.

The results were as shown in Table 2. Sample test results are compared to those of the standard sample 1.3, from example 1.

TABLE 2

| Sample Reference | Coag spray amount (vs standard) | Equivalent average filament diameter (micron) | Machine Direction | | Cross Direction | | Stiffness (vs standard) |
|---|---|---|---|---|---|---|---|
| | | | Strength (vs standard) | Extension (vs standard) | Strength (vs standard) | Extension (vs standard) | |
| 1.3 (close nozzle spacing) | 1.0× | 30 | 1.0× | 1.0× | 1.0× | 1.0× | 1.0× |
| 2.1 | 0.2× | 65 | 1.7× | 0.4× | 1.6× | 0.4× | 2.4× |
| 2.2 | 0.5× | 30 | 1.0× | 1.0× | 1.0× | 1.0× | 1.0× |
| 2.3 | 1.0× | 15 | 0.7× | 1.2× | 0.7× | 1.2× | 0.5× |
| 2.4 | 1.5× | 10 | 0.65× | 1.25× | 0.65× | 1.25× | 0.45× |
| 2.5 | 2.0× | 6 | 0.6× | 1.3× | 0.6× | 1.3× | 0.4× |

The results show that, at these operating conditions, increasing nozzle spacing reduces the degree of filament merge and, when combined with high levels of initial coagulation spray, gives a web with only very low amounts of merged filaments as measured by 'equivalent average filament diameter' technique. Trends in web properties are similar to those found in example 1.

What is claimed is:

1. A nonwoven material comprising one or more layers of nonwoven webs of continuous cellulosic filaments wherein within each layer three bonding mechanisms occur: a) hydrogen bonding, b) filament intermingling and c) merged filament bonding, for bonding the continuous cellulosic filaments,
  wherein, during manufacture, when contact of the continuous cellulosic filaments with a coagulation spray decreases by a factor of from about 2.0 times to about 0.2 times, (i) tensile strength increases by a factor of from about 0.7 times to about 1.8 times and/or (ii) stiffness increases by a factor of from about 0.5 times to about 2.5 times.

2. The nonwoven material according to claim 1, wherein the number of layers is at least two.

3. The nonwoven material according to claim 1, wherein the one or more layers are bonded together using at least one of merged filament bonding, hydrogen bonding or filament intermingling.

4. The nonwoven material according to claim 1, wherein the nonwoven material is hydroentangled, spunlaced, needled, needlepunched, bonded by adhesive, or bonded by other chemical bonding techniques, or combinations thereof.

5. The nonwoven material according to claim 1, wherein the nonwoven is subjected to one or more after-treatments.

6. The nonwoven material according to claim 1, wherein at least one of the one or more layers comprises lyocell filaments.

7. A wet cleaning wipe comprising the nonwoven material according to claim 1 and further comprising at least one additive.

8. A dry cleaning wipe comprising the nonwoven material according to claim 1 wherein the wipe can be used for household, institutional and industrial cleaning, polishing or surface preparation applications.

9. A dry cleaning wipe comprising the nonwoven material according claim 1 wherein said wipe is capable of at least one of water or oil absorption.

10. A cleaning wipe comprising the nonwoven material according to claim 1 coated with a dry lotion formulation.

11. An air filtration media comprising the nonwoven material according to claim 1.

12. A liquid filtration media comprising the nonwoven material according to claim 1.

13. A dryer sheet comprising the nonwoven material according to claim 1, wherein the nonwoven material is impregnated by at least one of an antistat, quaternary softeners or waxes.

14. A wound care absorbent layer comprising the nonwoven material according to claim 1.

15. The wound care absorbent layer of claim 14, wherein the nonwoven material is post-treated with at least one of an antibacterial chemical or other pharmaceutical active ingredient.

16. A moisture management layer comprising the nonwoven material according to claim 1, wherein the moisture management layer is incorporated in at least one product, wherein the product comprises disposable baby diapers, reusable baby diapers, feminine hygiene pads or adult incontinence products.

17. A carbonized web comprising the nonwoven material according to claim 1.

18. A dye catcher sheet comprising the nonwoven material according claim 1, wherein the dye catcher sheet is impregnated with at least one of the following agents: known chemical and polymeric dye transfer inhibitors, dye absorbers and scavengers, bleaching and oxidative agents or other chemicals.

19. A beauty face mask sheet comprising the nonwoven material according claim 1, wherein the beauty face mask sheet is impregnated with at least one of skin care and beauty lotions or liquids.

20. The beauty face mask sheet of claim 19, wherein the beauty face mask sheet is packaged dry and liquid-activated just prior to use by a post-treatment of at least one of a cosmetic ingredient, or water.

21. The nonwoven material according to claim 1, wherein the nonwoven material comprises two to ten layers of nonwoven webs.

22. The nonwoven material according to claim 5, wherein the one or more after-treatments comprise at least one of a chemical treatment or a plasma process.

23. The nonwoven material according to claim 22, wherein the nonwoven material comprises two to six layers of nonwoven webs.

24. The wet cleaning wipe according to claim 7, wherein the additive is a cleansing agent, a sterilizing agent, a deodorizing agent, a disinfectant, a moisturizing agent, a cosmetic remover or water.

\* \* \* \* \*